United States Patent
Suwald et al.

(10) Patent No.: US 11,321,437 B2
(45) Date of Patent: May 3, 2022

(54) METHOD FOR ENABLING A BIOMETRIC TEMPLATE

(71) Applicant: NXP B.V., Eindhoven (NL)

(72) Inventors: Thomas Suwald, Hamburg (DE); Jakob Friedrich Hille, Berlin (DE)

(73) Assignee: NXP B.V., Eindhoven (NL)

( * ) Notice: Subject to any disclaimer, the term of this patent is extended or adjusted under 35 U.S.C. 154(b) by 91 days.

(21) Appl. No.: 16/791,286

(22) Filed: Feb. 14, 2020

(65) Prior Publication Data
US 2020/0265131 A1  Aug. 20, 2020

(30) Foreign Application Priority Data
Feb. 19, 2019 (EP) .................................... 19157956

(51) Int. Cl.
*G06F 21/32* (2013.01)
*G06F 21/00* (2013.01)
*G06F 21/40* (2013.01)

(52) U.S. Cl.
CPC .............. *G06F 21/32* (2013.01); *G06F 21/40* (2013.01)

(58) Field of Classification Search
CPC .... G06F 21/32; H04L 9/3231; H04L 63/0861
See application file for complete search history.

(56) References Cited

U.S. PATENT DOCUMENTS

| 5,726,435 | A | 3/1998 | Hara et al. |
|---|---|---|---|
| 9,256,720 | B2 | 2/2016 | Berini et al. |
| 9,298,932 | B2 | 3/2016 | Dougharty et al. |
| 2002/0073340 | A1* | 6/2002 | Mambakkam .......... G06F 21/32 726/2 |
| 2013/0086389 | A1 | 4/2013 | Suwald |
| 2017/0300680 | A1 | 10/2017 | Wendling |
| 2019/0156020 | A1* | 5/2019 | Sato ...................... H04L 9/0894 |

(Continued)

FOREIGN PATENT DOCUMENTS

| GB | 2475033 A | 5/2011 |
|---|---|---|
| GB | 2556625 A | 6/2018 |

(Continued)

OTHER PUBLICATIONS

Digitalpersona Whitepaper; "Best Practices for Implementing Fingerprint Biometrics in Application;" Sep. 2012; http://devportal.digitalpersona.com:http://devportal.digitalpersona.com/docs/DP-wp-BestPracticesforImplementingBiometrics.pdf.

(Continued)

*Primary Examiner* — Alexander Lagor

(57) ABSTRACT

In accordance with a first aspect of the present disclosure, a method is conceived for enabling a biometric template in an authentication token, the method comprising: capturing, by a biometric sensor comprised in the authentication token, at least one biometric sample; creating, by a processing unit comprised in the authentication token, a biometric template from the at least one biometric sample and storing said biometric template in the authentication token; verifying, at a terminal device, said biometric template; verifying, by the terminal device, an identity of a user; enabling, by the terminal device, said biometric template if the biometric template and the identity of the user have been verified. In addition, a corresponding computer program, authentication token and terminal device are provided.

19 Claims, 3 Drawing Sheets

(56) References Cited

U.S. PATENT DOCUMENTS

| | | |
|---|---|---|
| 2019/0272363 A1 | 9/2019 | Suwald |
| 2020/0186522 A1* | 6/2020 | Apturkar ................. H04L 67/30 |
| 2020/0387589 A1* | 12/2020 | Gehrmann .............. G06F 21/32 |

FOREIGN PATENT DOCUMENTS

| | | |
|---|---|---|
| GB | 2563599 A | 12/2018 |
| WO | WO-2011024097 A1 | 3/2011 |

OTHER PUBLICATIONS

Gemalto Whitepaper; "Biometrics for Financial Institutions and the New Gemalto Biometric Sensor Payment Card;" Oct. 2017; www.gemalto.com. Retrieved from https://www.gemalto.com/brochures-site/download-site/Documents/:https://www.gemalto.com/brochures-site/download-site/Documents/fs-wp-biometric-sensor-payment-card.pdf.

* cited by examiner

METHOD FOR ENABLING A BIOMETRIC TEMPLATE

CROSS-REFERENCE TO RELATED APPLICATIONS

This application claims priority under 35 U.S.C. § 119 to European Patent Application No. 19157956.4, filed on Feb. 19, 2019, the contents of which are incorporated by reference herein.

TECHNICAL FIELD

The present disclosure relates to a method for enabling a biometric template in an authentication token. Furthermore, the present disclosure relates to a corresponding computer program. In addition, the present disclosure relates to a corresponding authentication token and to a corresponding terminal device.

BACKGROUND

Authentication tokens are widely used for executing a variety of transactions, for example payment transactions. Examples of such authentication tokens are wearable devices, internet-of-things (IoT) devices and smart cards, by means of which a user can authenticate himself to a specific device or service. Another example of an authentication token is a key for unlocking electronic door locks.

SUMMARY

In accordance with a first aspect of the present disclosure, a method is conceived for enabling a biometric template in an authentication token, the method comprising: capturing, by a biometric sensor comprised in the authentication token, at least one biometric sample; creating, by a processing unit comprised in the authentication token, a biometric template from the at least one biometric sample and storing said biometric template in the authentication token; verifying, at a terminal device, said biometric template; verifying, by the terminal device, an identity of a user; enabling, by the terminal device, said biometric template if the biometric template and the identity of the user have been verified.

In an embodiment, verifying the biometric template at the terminal device comprises: establishing a coupling between the authentication token and the terminal device; capturing, by the biometric sensor, a further biometric sample; matching, by the processing unit, the further biometric sample against the biometric template stored in the authentication token; concluding, by said processing unit, that the biometric template has been verified if the further biometric sample matches the biometric template; transmitting, by said processing unit through said coupling, if said biometric template has been verified, a signal indicative thereof to the terminal device.

In an embodiment, verifying the identity of the user comprises: comparing a user input with a secret stored in the terminal device; concluding, by the terminal device, that the identity of the user has been verified if the user input matches said secret.

In an embodiment, the secret stored in the terminal device is a personal identification number.

In an embodiment, capturing the at least one biometric sample comprises capturing a plurality of biometric samples, and creating the biometric template comprises creating the biometric template from said plurality of biometric samples.

In an embodiment, the method further comprises: capturing, by the biometric sensor, a test sample after capturing the at least one biometric sample; matching, by the processing unit, the test sample against the biometric template stored in the memory as a test for subsequent matching attempts.

In an embodiment, storing the biometric template in the authentication token comprises storing the biometric template in a secure element comprised in the authentication token.

In an embodiment, the biometric is a fingerprint, a face image, a vein pattern, or an iris pattern.

In an embodiment, the method further comprises writing, by the terminal device in the authentication token, if said biometric template has been enabled, data indicative thereof in the authentication token.

In an embodiment, the authentication token is at least one of a wearable device, a smart card, an internet-of-things device, and a key for accessing a vehicle.

In an embodiment, the number of biometric template enablement attempts is limited, and/or the number of biometric sample capturing attempts is limited.

In accordance with a second aspect of the present disclosure, a computer program is provided, comprising computer-executable instructions that, when executed, carry out or control a method of the kind set forth.

In accordance with a third aspect of the present disclosure, an authentication token is provided, comprising a biometric sensor and a processing unit, wherein: the biometric sensor is configured to capture at least one biometric sample; the processing unit is configured to create a biometric template from the biometric sample; the processing unit is further configured to store said biometric template in the authentication token for subsequent verification and enablement by a terminal device.

In accordance with a fourth aspect of the present disclosure, a terminal device is provided for enabling a biometric template in an authentication token, the terminal device being configured to: verify the identity of a user; enable the biometric template if the biometric template has been verified at the terminal device and if the identity of the user has been verified.

In an embodiment, a biometric template enablement system comprises an authentication token of the kind set forth and a terminal device of the kind set forth.

DESCRIPTION OF DRAWINGS

Embodiments will be described in more detail with reference to the appended drawings, in which.

DESCRIPTION OF EMBODIMENTS

Authentication tokens are widely used for executing a variety of transactions, for example payment transactions. Examples of such authentication tokens are wearable devices, internet-of-things (IoT) devices and smart cards, by means of which a user can authenticate himself to a specific device or service. Another example of an authentication token is a key for unlocking electronic door locks.

Authentication tokens may be equipped with biometric sensors. Non-limiting examples of biometrics include fingerprints, face images, vein patterns, and iris patterns. The biometric sensors are configured to capture biometric samples, which are converted to biometric templates by a processing unit of the authentication token. A biometric template is a digital representation of distinct characteristics that have been extracted from a biometric sample. Templates are used during the biometric authentication process. More specifically, during said process, a biometric template generated from live samples is compared to a reference template, and if the biometric template matches the reference template, the authentication process produces a positive authentication result. Before the biometric authentication process can be carried out, a biometric should be enrolled in the authentication token. This means that the authentication token should be provided with a valid reference template. The enrolment should take place in a secure environment. Unfortunately, from a user perspective, this is inconvenient, because the user should travel to the premises of a service provider, for example.

Figure 1:
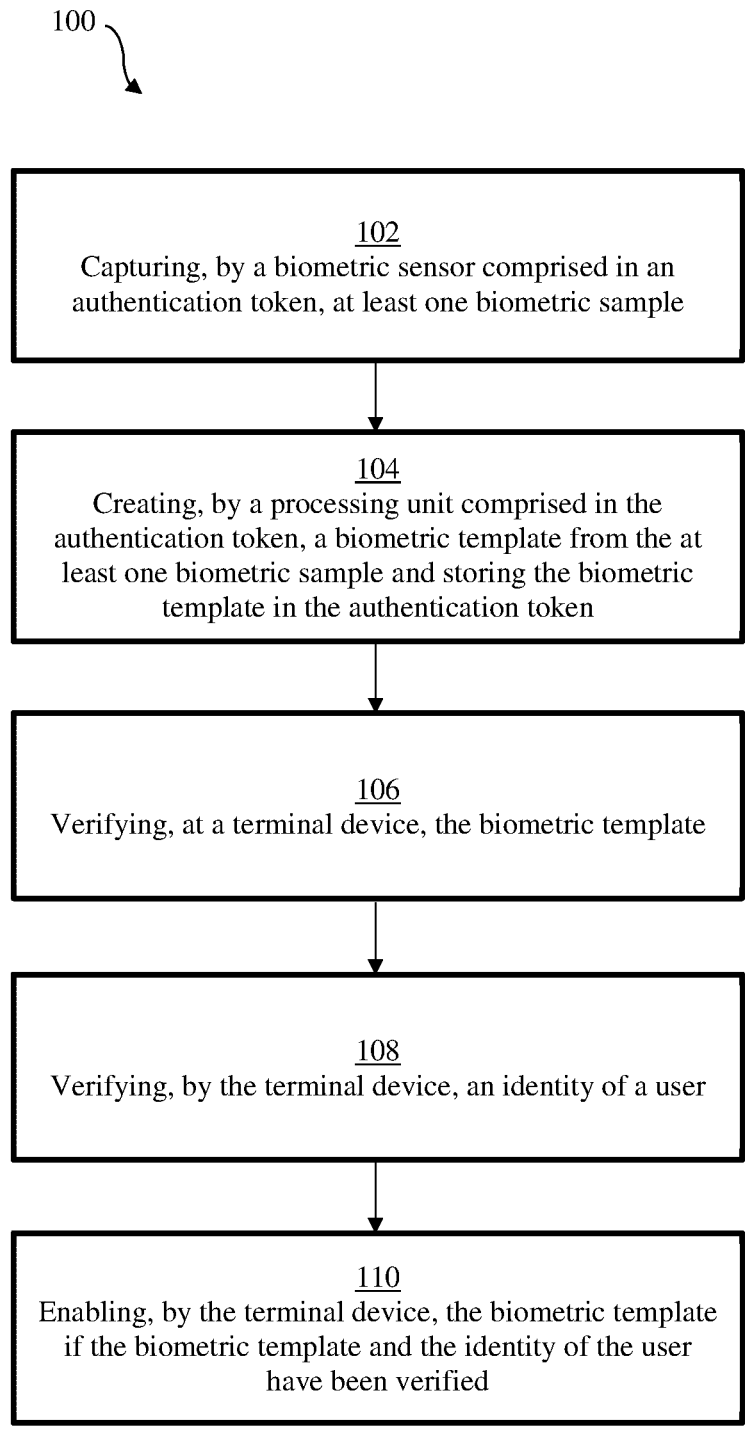
FIG. 1 shows an illustrative embodiment of a method for enabling a biometric template.

FIG. 1 shows an illustrative embodiment of a method 100 for enabling a biometric template. In particular, FIG. 1 shows a method 100 in accordance with a first aspect of the present disclosure. The method 100 comprises: capturing 102, by a biometric sensor comprised in an authentication token, at least one biometric sample; creating 104, by a processing unit comprised in the authentication token, a biometric template from the biometric sample and storing the biometric template in the authentication token; verifying 106, at a terminal device, said biometric template; verifying 108, by the terminal device, an identity of a user; and enabling 110, by the terminal device, said biometric template if the biometric template and the identity of the user have been verified. In this way, a biometric can be enrolled in the authentication token in a relatively insecure environment. Thus, it may not be necessary that a user travels to the premises of a service provider (e.g., a bank) to enrol a biometric in the authentication token.

In particular, the method comprises two parts: (1) capturing a biometric sample, creating a biometric template and storing the biometric template in the token, and (2) verifying the biometric template, verifying the identity of a user, and enabling the biometric template if both the template and the identity of the user have been verified. Part (1) of the method can be carried out fully offline, for example at a user's home: the biometric template that is stored in the authentication token can be regarded as an intermediately stored biometric template that still needs to be verified and enabled for subsequent use. In this context, enabling the biometric template means that it is enabled as a valid reference template. Part (2) of the method covers the verification of the template and the verification of a user: this part can be carried out at any normal terminal device (e.g., a normal ATM). Since the terminal device is capable of verifying the identity of the user—for example by requesting a personal identification number (PIN)—this part does not need to be carried out in a special secure environment at the premises of a service provider. At the same time, an acceptable level of security is achieved. In a practical and effective implementation, the steps of the method can be implemented, at least partially, as a computer program.

In accordance with a second aspect of the present disclosure, an authentication token is provided, comprising a biometric sensor and a processing unit, wherein: the biometric sensor is configured to capture at least one biometric sample; the processing unit is configured to create a biometric template from the biometric sample; the processing unit is further configured to store said biometric template in the authentication token for subsequent verification and enablement by a terminal device. Furthermore, in accordance with a third aspect of the present disclosure, a terminal device is provided for enabling a biometric template in an authentication token, the terminal device being configured to: verify the identity of a user; enable the biometric template if the biometric template has been verified at the terminal device and if the identity of the user has been verified. The authentication token and terminal device according to these aspects are interrelated devices that support the implementation of the presently disclosed method. In an embodiment, a biometric template enablement system comprises an authentication token and a terminal device of the kind set forth.

Figure 2:
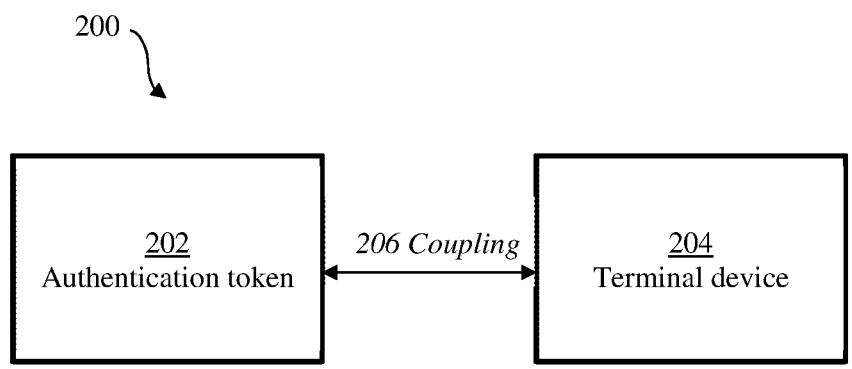
FIG. 2 shows an illustrative embodiment of a system for enabling a biometric template.

FIG. 2 shows an illustrative embodiment of a system 200 for enabling a biometric template. The system 200 comprises an authentication token 202 and a terminal device 204. The authentication token 202 comprises a biometric sensor (not shown) and a processing unit (not shown). The biometric sensor is configured to capture at least one biometric sample. Furthermore, the processing unit is configured to create a biometric template from the biometric sample, and to store the biometric template in the authentication token for subsequent verification and enablement by the terminal device 204. The authentication token 202 and terminal device 204 can be coupled 206 to each other, for example through a contact-bound or contact-less interface. The terminal device 204 is configured to verify the identity of a user, and to enable the biometric template if two conditions are met: (1) the biometric template has been verified at the terminal device 204 and (2) the identity of the user has been verified.

Transaction network providers demand that transaction tokens with biometric authentication (i.e. authentication tokens) are capable of remote enrolment, to avoid inconvenient travel of a token holder to a security-controlled enrolment site. A challenging step from a security perspective is the enablement of a biometric template as a reference template, because this step ultimately links a token holder's identity to his biometric. Thus, this step should be protected against influences from or interceptions by unauthorized third parties, and it should be executed in a security-controlled environment. In this context, remote enrolment means that a token holder can enter his biometric into an authentication token in an environment that is not security-controlled, for example at home, but without being connected to any network or device (e.g. computer, laptop or smartphone) other than the token. In the absence of such a connection, the risk of interceptions can be minimized.

In accordance with the present disclosure, the requirement to execute the enrolment in a secure environment may be met by splitting up the enrolment process into a security-irrelevant part and a security-relevant part. The security-relevant part—i.e. the second part of the presently disclosed method—only comprises biometric template verification, token holder verification and the enablement of a template as reference template. The inventor has realized that these security-relevant steps can conveniently be carried out at terminal devices, such as transaction terminals that are widely used and available in many places. Thus, these security-relevant steps do not require more security than that provided by regular terminal devices. The security-irrelevant part—i.e. the first part of the presently disclosed method—comprises capturing of biometrics, biometric template generation and intermediate template storage.

To securely enable a biometric template as a reference template, the following steps may be executed during a session at e.g. an approved transaction terminal: verifying the template against a biometric sample provided by the token holder, and verifying a secret provided by the token holder, which is indicative of the token holder's identity. If both verifications have a positive result, the token holder's biometric is effectively linked to his identity by enabling the biometric template as a reference template. The latter may be achieved, for example, by writing data indicative of such an enablement into the authentication token. For instance, a flag may be set that allows subsequent use of the reference template.

In an embodiment, verifying the biometric template at the terminal device comprises: establishing a coupling between the authentication token and the terminal device; capturing, by the biometric sensor of the authentication token, a further biometric sample; matching, by the processing unit of the authentication token, the further biometric sample against the biometric template stored in the authentication token; concluding, by said processing unit, that the biometric template has been verified if the further biometric sample matches the biometric template; transmitting, by said processing unit through said coupling, if said biometric template has been verified, a signal indicative thereof to the terminal device. Verifying the biometric template against a biometric sample provided by the token holder during a session with the terminal device increases the security level, because it implies that the identity of the token holder is verified explicitly by the terminal device (e.g. by requesting a PIN) and implicitly in the sense that the token holder who created the template (according to the first part of the method) should verify his identity claim by providing another biometric sample through the token's biometric sensor.

Thus, in this way, a three-factor authentication is implemented for enabling the biometric template at a terminal device: a user or token holder should possess the authentication token (something to have), the user or token holder should be able to input a secret (something to know), and the user or token holder should input another biometric sample (something to be). The terminal device does not need to be modified to support this three-factor authentication, because inputting the biometric sample can be performed on the authentication token, which communicates with the terminal device during the session. It is noted that the verb "match" as used herein should be interpreted broadly, for example if the biometric sample is said to "match" the biometric template, then the biometric template does not need to be an exact digital representation of the sample, but a certain error margin may be taken into account.

In an embodiment, verifying the identity of the user comprises comparing a user input with a secret stored in the terminal device, and concluding, by the terminal device, that the identity of the user has been verified if the user input matches said secret. In other words, the user enters a user input representing a secret, which is matched against a stored secret, to verify the identity of the user. In a practical and effective implementation, the stored secret is a personal identification number (PIN).

In an embodiment, capturing the at least one biometric sample comprises capturing a plurality of biometric samples, and creating the biometric template comprises creating the biometric template from said plurality of biometric samples. In other words, the biometric template is generated using multiple biometric samples. In this way, the FAR and FRR can be tuned. The false acceptance rate (FAR) is the probability that a biometric system incorrectly authorizes a non-authorized person, due to incorrectly matching a biometric input with a template. The FAR is normally expressed as a percentage. The false rejection rate (FRR) is the probability that a biometric system incorrectly rejects access to an authorized person, due to failing to match the biometric input with a template. The FRR is normally also expressed as a percentage. By using multiple biometric samples for creating a template, the reliability of future matching attempts may be increased, so that the FAR and FRR can be kept within acceptable limits.

In an embodiment, the method further comprises: capturing, by the biometric sensor of the authentication token, a test sample after capturing the at least one biometric sample, and matching, by the processing unit of the authentication token, the test sample against the biometric template stored in the memory as a test for subsequent matching attempts. In this way, it can be tested whether the authentication token is able to recognize a user's biometric sample as authentic, before the verification and enablement take place at the terminal device. This, in turn, increases the reliability of the system.

In an embodiment, storing the biometric template in the authentication token comprises storing the authentication token in a secure element of the authentication token. In this way, the biometric template, which is a piece of sensitive data, resides within a protected environment. A secure element may for example be an embedded chip, more specifically a tamper-resistant integrated circuit with installed or pre-installed smart-card-grade applications, for instance payment applications, which have a prescribed functionality and a prescribed level of security. Furthermore, a secure element may implement security functions, such as cryptographic functions and authentication functions.

Furthermore, in an embodiment, the number of biometric template enablement attempts is limited, and/or the number of biometric sample capturing attempts is limited. In this way, the level of security is further increased. Example implementations, which apply an Enrolment Try Counter (ETC), a Biometric Try Counter (BTC), and/or an Enrolment Biometric Try Counter (EBTC), will be explained below.

Figure 3:
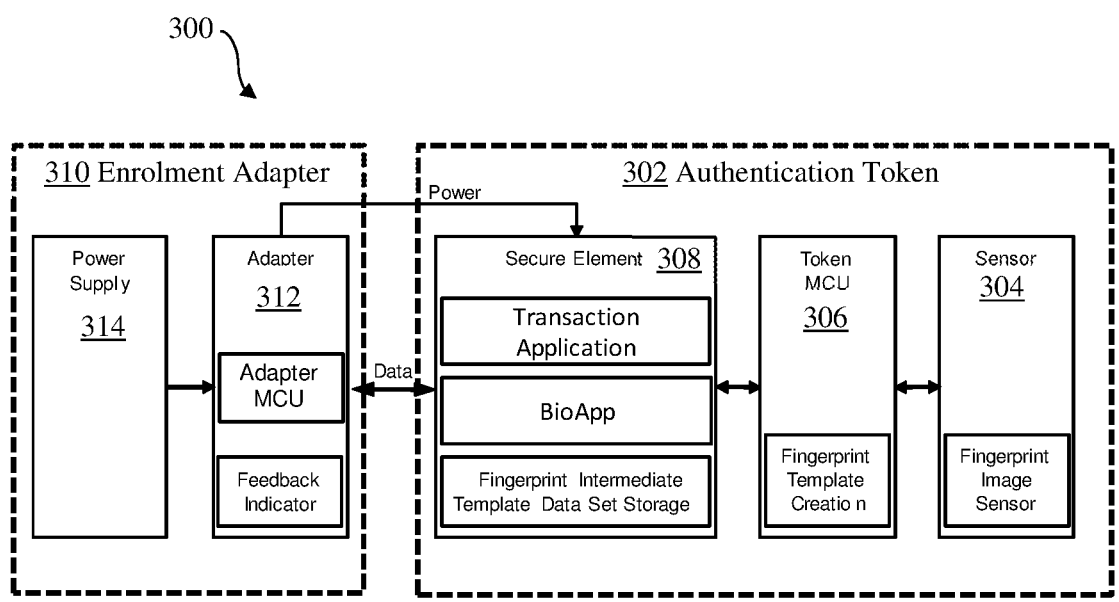
FIG. 3 shows an illustrative embodiment of a system for enrolling a biometric.

FIG. 3 shows an illustrative embodiment of a system 300 for enrolling a biometric. In particular, FIG. 3 shows a system 300 for carrying out the first part of the presently disclosed method. The system 300 can for example be used to provide an authentication token with an intermediately stored biometric template at a user's home. The system 300 comprises an authentication token 302 that is operatively coupled to an enrolment adapter 310. It is noted that the enrolment adapter 310 may not be needed for carrying out the first part of the presently disclosed method. In case the authentication token 302 does not have its own power source, it may be powered by the enrolment adapter 310. For this purpose, the enrolment adapter 310 may comprise a power supply unit 314 controlled by an adapter unit 314. The authentication token 302 comprises a sensor 304, a microcontroller 306, and a secure element 308. In the present example, the sensor 304 is a fingerprint sensor. As noted, however, the sensor may be any other kind of biometric sensor, for example a face recognition sensor, a vein pattern sensor, or an iris pattern sensor.

Figure 4:
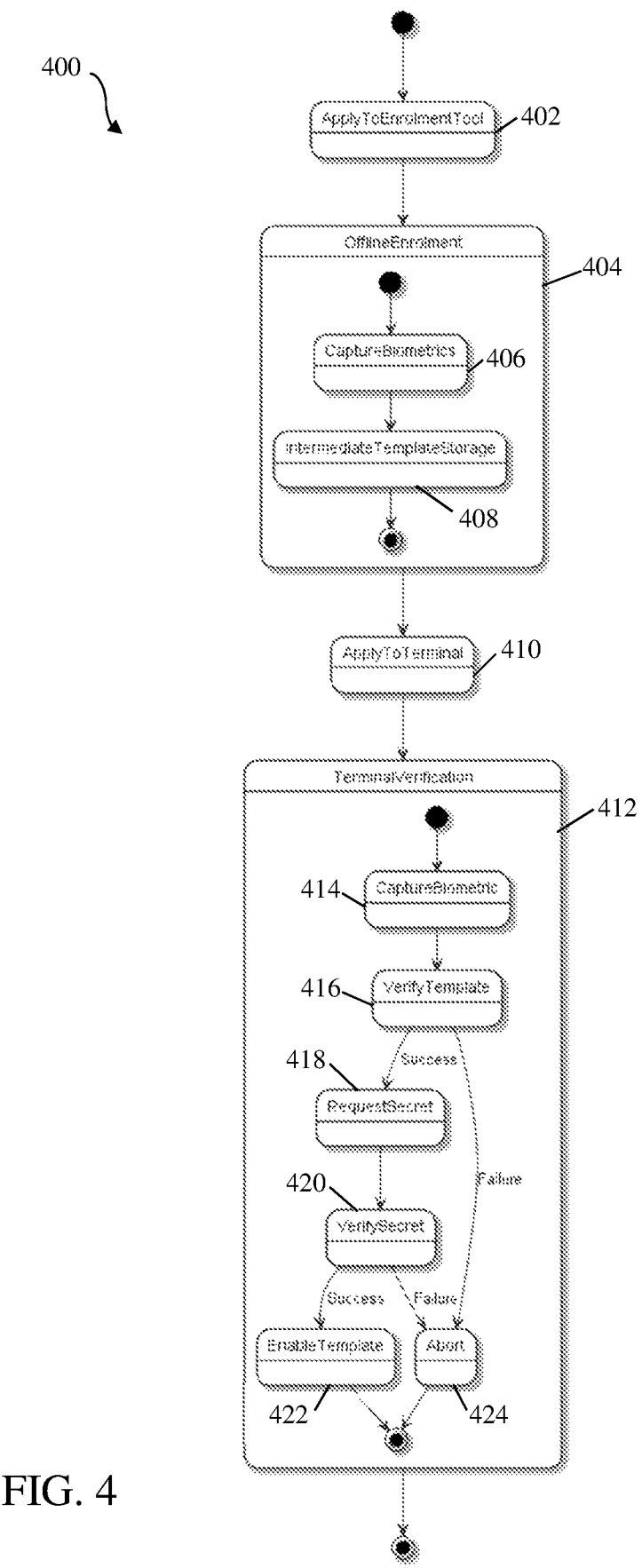
FIG. 4 shows another illustrative embodiment of a method for enabling a biometric template.

FIG. 4 shows another illustrative embodiment of a method 400 for enabling a biometric template. In particular, FIG. 4 shows a more detailed, non-limiting example of a method of the kind set forth. The method 400 comprises a first step 404 (OfflineEnrolment) of capturing 406 a biometric, generating a biometric template and intermediate template storage 408, and a second step 412 (Terminal Verification) executed at an approved transaction terminal, comprising verification 416 of the intermediately stored template by a captured 414 biometric sample and a secret provided by a user (i.e., a token holder), and in case of positive verification of the biometric template and the secret, enablement 422 of the intermediately stored template as reference template.

Within the first step, the token holder may input enough biometric samples as required to meet a certain false rejection rate (FRR) and false acceptance rate (FAR) during later verification of identity claims. Thus, in other words, the biometric sensor may capture 406 a plurality of biometric samples, and the processing unit may create the biometric template based on this plurality. In addition, the token holder may input a test sample, which can be used to test if the generated template can be used as a reliable template against which further biometric samples can be matched. The first step may be executed by the token holder at an arbitrary location, for example at home, because it does not require a connection to an external device or system. The second step may be executed at a secure transaction terminal, which may e.g. be an ATM or banking terminal, a payment terminal at a grocery store or a payment terminal at a fuel station. In this second step, the token holder may couple 410 the authentication token to the terminal, provide on request of the terminal a biometric sample to the biometric token, the captured 414 biometric sample then being applied to verify 416 the intermediately stored template by successfully matching the captured 414 biometric sample against the intermediately stored template. Furthermore, in the second step, the token holder may provide on request 418 of the terminal a secret that is subsequently used to verify 420 the token holder's identity.

If the captured 414 biometric sample matches the intermediately stored template and the secret entered by the user verifies the token holder's identity claim, then the intermediately stored template may be enabled as a reference template. In a way, the template verification represents a "reverse"-match between the template and captured biometrics. This match is executed in a kind of sandbox environment, because the intermediately stored template may only be utilized for template verification, but not for a normal biometric authentication process. Thus, an attack that involves an unauthorized person who gains access to a biometric token and stores an imposter's template on the token can be countered.

As long as no template is enabled as a reference template, the token cannot be utilized for biometric verification. If no template is enabled as a reference template, the second step may be executed upon next coupling of the authentication token to a transaction terminal. For instance, if the authentication token is a smart card, then the second step may be executed when it coupled to a terminal. In an embodiment, the template being intermediately stored is stored in the secure storage of a secure element to protect it against unwanted access by unauthorized thirds. Furthermore, the second step may be carried out transparently for the token holder as part of a normal identity claim being made to a transaction terminal. In this case, the token holder may observe that following the request to provide a biometric sample there may be an additional request to apply another token holder verification method, e.g. a request to enter a PIN.

In an embodiment, the parts of the step 412 of "TerminalVerification" that are executed by the authentication token may be implemented as, or supported by, software components, more specifically a biometric capturing and matching component (BioApp) and a transaction component (PaymentApp). Both components, the BioApp and the PaymentApp, may reside within the secure environment of a secure element to protect these components against unauthorized access by thirds.

The transaction component may communicate with the transaction network and thus couple the authentication token to the transaction network and through said transaction network to a transaction backend. The transaction component may also communicate with the terminal's infrastructure components, specifically with its user interface. When the authentication token is coupled to the transaction network, a mechanism to select a verification method may be started. Such verification methods may e.g. comprise biometric verification and the personal identification number (PIN) verification. In case biometric verification has been selected, the PaymentApp may invoke the BioApp to request a biometric verification result. The BioApp may for example return the following responses to the calling PaymentApp:

Biometrics acquired AND Match
Biometrics acquired AND Match AND No Template enabled
Biometrics acquired AND No Match
In case the response is one of the following responses:
Biometrics acquired AND No Match,
Biometrics acquired AND No Match AND No Template enabled, or
Failure to Acquire,
the PaymentApp may invoke an alternative token holder verification method.

In case the response is "Biometrics acquired AND Match AND No Template enabled", the PaymentApp may capture a token holder's secret by e.g. invoking PIN verification, and upon successful PIN verification the PaymentApp may request the BioApp to enable the intermediately stored template as a reference template.

In a practical and effective implementation, enablement of a template as a reference template may be implemented by setting a template enable flag within the BioApp, wherein this flag should be located within a secure storage area of the secure element hosting PaymentApp and BioApp.

Furthermore, in a practical and effective implementation, the number of enrolment attempts may be controlled by an Enrolment Try Counter (ETC). Such an ETC may be configured by the authentication token issuer to a certain limit. Once the limit is exceeded, enablement of an intermediately stored template as a reference template may be blocked. In this way, brute force enrolment attacks on such a token can be countered.

In another practical and effective implementation, the BioApp may comprise a Biometric Try Counter (BTC). Such a BTC may be configured by the authentication token issuer to a certain limit. Once the limit is exceeded, the BioApp may skip capturing a biometric and may e.g. respond with "Failure to Acquire". In this way, brute force enrolment attacks on such a token can be countered.

In another practical and effective implementation, the BioApp may again comprise a Biometric Try Counter (BTC). Such a BTC may be configured by the authentication token issuer to a certain limit. Once the limit is exceeded, the BioApp may disable the reference template and turn it into an intermediately stored template. In this case, the BioApp may skip capturing a biometric and may e.g. respond with "Failure to Acquire". Since no reference template is available, re-enrolment may be required. In this way, brute force enrolment attacks on such a token can be countered.

In another practical and effective implementation embodiment, the BioApp may comprise a separate Enrolment Biometric Try Counter (EBTC). Such an EBTC may be configured by the authentication token issuer to a certain limit. During the second step, if the limit is exceeded, the BioApp may skip further capturing a biometric and may e.g. respond with "Failure to Acquire".

Furthermore, during the first step a BTC may be reset upon successful verification of at least one further biometric sample against the intermediately stored template. In this embodiment no EBTC may be required and the BTC may control the number of biometric verification attempts during the second step. If the limit set by the token issuer for the BTC is exceeded, the BioApp may skip further capturing a biometric and may e.g. respond with "Failure to Acquire".

The "OfflineEnrolment" step 404 may involve an enrolment adapter 310 as shown in FIG. 3, having an embedded microcontroller (MCU), a power supply 314, and user interface components (feedback indicator) that may e.g. be light emitting diodes (LED). This enrolment adapter 310 may be coupled to the authentication token 302 via an contact-bound interface (e.g. conforming to the standard ISO/IEC 7816) or a contact-less interface (e.g. conforming to the standard ISO/IEC 14443). The MCU of the enrolment adapter 310 may execute steps that control the user interface components, so as to guide the token holder through the steps as required to capture biometric samples and generate a template from those biometric samples. To facilitate capturing biometric samples, the MCU may be configured to stimulate the secure element 308 within the authentication token 302 to initiate the capturing of biometric samples through the token's biometric sensor 304. Furthermore, the adapter MCU may be configured to stimulate the processing unit 306 (token MCU) to create an intermediately stored biometric template from the captured biometric samples, and to stimulate the secure element 308 to initiate the capturing of a further biometric sample (test sample) with the purpose of testing that the intermediately stored template can be used to match subsequently captured biometric samples against it.

In practical and effective implementations, the PaymentApp may stimulate the BioApp to configure a BTC, stimulate the BioApp to configure an ETC, and/or stimulate the BioApp to configure an EBTC. Furthermore, in a practical and effective implementation, the PaymentApp may return the result of a secret verification, with the secret e.g. being a PIN, to the BioApp in case the BioApp communicated "Biometrics acquired AND Match AND No Template enabled" previously to the PaymentApp. In addition, in a practical and effective implementation, the PaymentApp may stimulate the BioApp to enable an intermediately stored template as a reference template upon a positive verification of a secret provided by the token holder, with the secret e.g. being a PIN, and in case the BioApp communicated "Biometrics acquired AND Match AND No Template enabled" previously to the PaymentApp. It is noted that the required secret may be provided to the user upfront by a suitable secure provisioning channel.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 method for enabling a biometric template
102 capturing, by a biometric sensor comprised in an authentication token, at least one biometric sample
104 creating, by a processing unit comprised in the authentication token, a biometric template from the at least one biometric sample and storing the biometric template in the authentication token
106 verifying, at a terminal device, the biometric template
108 verifying, by the terminal device, an identity of a user
110 enabling, by the terminal device, the biometric template if the biometric template and the identity of the user have been verified
200 system for enabling a biometric template
202 authentication token
204 terminal device
206 coupling
300 system for enrolling a biometric
302 authentication token
304 sensor
306 microcontroller of the token
308 secure element
310 enrolment adapter
312 adapter
314 power supply
400 method for enabling a biometric template
402 apply to enrolment tool
404 offline enrolment
406 capture biometrics
408 intermediate template storage
410 apply to terminal
412 terminal verification
414 capture biometric
416 verify template
418 request secret
420 verify secret
422 enable template
424 abort

The invention claimed is:

1. A method for enabling a biometric template in an authentication token, the method comprising:
    capturing offline, by a biometric sensor comprised in the authentication token, at least one biometric sample;
    creating, by a processing unit comprised in the authentication token, a biometric template from the at least one biometric sample and storing said biometric template in the authentication token;
    establishing a coupling between the authentication token and the terminal device;
    capturing, by the biometric sensor, a further biometric sample; and
    verifying, at a terminal device, said biometric template based the matching of the further biometric sample;
    matching, by the processing unit, the further biometric sample against the verified biometric template stored in the authentication token;
    verifying, by the terminal device, an identity of a user based upon a user input provided directly to the terminal device;
    enabling, by the terminal device, said biometric template after three factor authentication including: verification of the biometric template, verification of the identity of the user, and the matching of the further biometric sample against the verified biometric template, wherein enabling said biometric template includes writing, by the terminal device, data indicative of the enabling in the authentication token.

2. The method of claim 1, wherein verifying the biometric template at the terminal device comprises:
    transmitting, by said processing unit through said coupling, after said biometric template has been verified, a signal indicative thereof to the terminal device.

3. The method of claim 1, wherein verifying the identity of the user comprises:
    comparing a user input with a secret stored in the terminal device;
    concluding, by the terminal device, that the identity of the user has been verified after the user input matches said secret.

4. The method of claim 3, wherein the secret stored in the terminal device is a personal identification number.

5. The method of claim 1, wherein capturing the at least one biometric sample further comprises:
    capturing a plurality of biometric samples, and wherein creating the biometric template further comprises:
    creating the biometric template from said plurality of biometric samples.

6. The method of claim 1, further comprising:
    capturing, by the biometric sensor, a test sample after capturing the at least one biometric sample;
    matching, by the processing unit, the test sample against the biometric template stored in the memory as a test for subsequent matching attempts.

7. The method of claim 1, wherein storing the biometric template in the authentication token further comprises:
    storing the biometric template in a secure element comprised in the authentication token.

8. The method of claim 1, wherein the at least one biometric sample is a fingerprint, a face image, a vein pattern, or an iris pattern.

9. The method of claim 1, wherein the authentication token is at least one of a wearable device, a smart card, an internet-of-things device, and a key for unlocking an electronic door lock.

10. The method of claim 1, wherein the number of biometric template enablement attempts is limited, and/or the number of biometric sample capturing attempts is limited.

11. A computer program comprising computer-executable instructions stored in a non-transient computer readable medium that, when executed, carry out or control the method of claim 1.

12. An authentication token comprising
a biometric sensor, wherein the biometric sensor is configured to capture offline at least one biometric sample; and
a processing unit configured to:
create a biometric template from the at least one biometric sample; and
store said biometric template in the authentication token for subsequent verification and enablement by a terminal device,
wherein the stored biometric template is enabled after three factor authentication, including: verification of the biometric template, verification of the identity of the user, and matching of the further biometric sample against the verified biometric template, and
wherein enabling said biometric template includes writing data received from the terminal device indicative of the enabling in the authentication token.

13. A terminal device for enabling a biometric template created from at least one biometric sample in an authentication token, the terminal device being configured to:
verify the identity of a user based upon a user input provided directly to the terminal device; and
enable the biometric template after three factor authentication including: verification of the biometric template, verification of the identity of the user, and matching of the further biometric sample against the verified biometric template, wherein enabling said biometric template includes writing, by the terminal device, data indicative of the enabling in the authentication token.

14. A biometric template enablement system comprising the authentication token of claim 12.

15. The authentication token of claim 12, wherein the at least one biometric sample is a fingerprint, a face image, a vein pattern, or an iris pattern.

16. The authentication token of claim 12, wherein the authentication token is at least one of a wearable device, a smart card, an internet-of-things device, and a key for unlocking an electronic door lock.

17. The authentication token of claim 12, wherein the biometric template is stored in a secure element comprised in the authentication token.

18. The terminal device of claim 13, wherein the at least one biometric sample is a fingerprint, a face image, a vein pattern, or an iris pattern.

19. The terminal device of claim 13, wherein the authentication token is at least one of a wearable device, a smart card, an internet-of-things device, and a key for unlocking an electronic door lock.

* * * * *